US009819660B2

(12) United States Patent
Tredoux et al.

(10) Patent No.: US 9,819,660 B2
(45) Date of Patent: Nov. 14, 2017

(54) SYSTEMS AND METHODS FOR DOCUMENT AUTHENTICATION

(71) Applicant: Xerox Corporation, Norwalk, CT (US)

(72) Inventors: Gavan L. Tredoux, Penfield, NY (US); Roger T. Kramer, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 328 days.

(21) Appl. No.: 14/250,489

(22) Filed: Apr. 11, 2014

(65) Prior Publication Data

US 2015/0295898 A1    Oct. 15, 2015

(51) Int. Cl.
*H04L 29/06* (2006.01)
*H04L 9/32* (2006.01)
(Continued)

(52) U.S. Cl.
CPC .......... *H04L 63/0492* (2013.01); *G06F 3/00* (2013.01); *G06F 3/12* (2013.01); *G06F 21/608* (2013.01); *G06F 21/645* (2013.01); *H04L 9/32* (2013.01); *H04L 9/3234* (2013.01); *H04L 9/3242* (2013.01); *H04L 9/3244* (2013.01); *H04L 9/3247* (2013.01); *H04L 9/3281* (2013.01); *H04L 63/0428* (2013.01);
(Continued)

(58) Field of Classification Search
CPC ......... G06F 21/64; H04L 9/32; H04L 9/3242; H04L 9/3244; H04L 9/3281; H04L 9/3234; H04L 63/0853; H04L 9/3247
See application file for complete search history.

(56) References Cited

U.S. PATENT DOCUMENTS 6,170,744 B1    1/2001    Lee et al.
6,907,528 B1 *  6/2005    Bunn ................... G06Q 20/389
                                                             713/155
(Continued)

FOREIGN PATENT DOCUMENTS

WO     2006081861 A1    8/2006

OTHER PUBLICATIONS

Warasart et al., "Paper-based Document Authentication using Digital Signature and QR Code", 2012, pp. 94-98.*
(Continued)

*Primary Examiner* — Thaddeus Plecha
(74) *Attorney, Agent, or Firm* — Gibb & Riley, LLC

(57) ABSTRACT

Disclosed are systems and methods that provide authentication for printed and/or electronic versions of a document through the use of a document authentication device in the form of a computational tag configured for short-range wireless communication only. This document authentication device receives authentication information for a document from a computerized device over a wireless communication link and uses this authentication information to generate encoded data to be embedded in the document in order to establish the authenticity of the document by functioning as an imprimatur. Specifically, when embedded in the document, this encoded data can add a visible feature or non-visible feature that, upon inspection, establishes the authenticity of an electronic version of the document and/or can add a printable feature, which will be readable off a surface of a printed version of the document to establish the authenticity of that printed version.

21 Claims, 8 Drawing Sheets

(51) Int. Cl.

| | | |
|---|---|---|
| *G06F 21/60* | (2013.01) | |
| *H04W 12/06* | (2009.01) | |
| *G06F 3/00* | (2006.01) | |
| *G06F 21/64* | (2013.01) | |
| *G06F 3/12* | (2006.01) | |
| *H04W 4/00* | (2009.01) | |

(52) U.S. Cl.
 CPC ......... *H04L 63/0853* (2013.01); *H04W 12/06* (2013.01); *H04W 4/008* (2013.01)

(56) References Cited

U.S. PATENT DOCUMENTS

| | | | |
|---|---|---|---|
| 7,689,249 B2 | 3/2010 | Silverbrook et al. | |
| 7,797,535 B2 | 9/2010 | Sakai | |
| 8,189,225 B1 | 5/2012 | Lo et al. | |
| 8,317,085 B2 | 11/2012 | Roquemore, III | |
| 8,526,608 B2 | 9/2013 | Song et al. | |
| 2002/0186838 A1* | 12/2002 | Brandys | G06Q 20/341 380/30 |
| 2003/0023851 A1* | 1/2003 | Peha | G06F 21/6209 713/176 |
| 2007/0174629 A1 | 7/2007 | Suominen | |
| 2007/0265033 A1 | 11/2007 | Brostrom | |
| 2011/0070834 A1 | 3/2011 | Griffin et al. | |
| 2012/0072829 A1 | 3/2012 | Bloch | |
| 2013/0031150 A1* | 1/2013 | Kamath | G06F 17/2264 707/827 |
| 2013/0046991 A1* | 2/2013 | Lu | H04L 9/3234 713/176 |
| 2013/0215467 A1 | 8/2013 | Fein et al. | |
| 2013/0341410 A1 | 12/2013 | McWilliams | |
| 2014/0070002 A1 | 3/2014 | Pineau et al. | |
| 2014/0074722 A1* | 3/2014 | Abel | G06Q 20/3278 705/71 |
| 2014/0230014 A1* | 8/2014 | Tomizawa | H04L 9/3242 726/2 |
| 2014/0298434 A1* | 10/2014 | Prchal | H04W 4/026 726/7 |

OTHER PUBLICATIONS

U.S. Appl. No. 13/852,238, Tredoux et al., "System and Method for Location Assurance Using Passive Computational Tags", Application filed Mar. 28, 2013.

\* cited by examiner

SYSTEMS AND METHODS FOR DOCUMENT AUTHENTICATION

BACKGROUND

The systems and methods disclosed herein relate to document authentication and, more particularly, to securely generating encoded data on demand based on authentication information associated with a document and incorporating that encoded data into the document for authentication purposes.

Historically, physical documents (i.e., non-electronic documents, including, but not limited to, hand-written, printed or copied documents) have been authenticated using imprimaturs (i.e., official marks of genuineness or validity), which are applied to the surface of a physical document using, for example, a unique stamp. These imprimaturs have many enduring conveniences, even in the digital age, because they require physical possession of the stamp itself and because they can be applied onto the surface of any type of physical document. Unfortunately, they offer only weak guarantees of genuineness or validity because the official marks can be forged and/or the stamps used to apply them may be duplicated.

Recently, techniques have been developed for embedding encoded data into a document (e.g., barcode marks, microtext marks, etc. into a printed version of a document or a digital signature into an electronic version of a document). This encoded data functions as an imprimatur in that it can subsequently be decoded and read to authenticate the printed and/or electronic versions of the document. These techniques offer greater guarantees of genuineness or validity than the imprimaturs discussed above. However, they are not foolproof because computerized devices that execute the encryption algorithms used to generate the encoded data are typically only password protected and are network accessible. Thus, they can be hacked and the encryption algorithms can be cracked.

SUMMARY

In view of the foregoing, disclosed herein are systems and methods that provide authentication for printed and/or electronic versions of a selected document. In the systems and methods, document authentication is accomplished through the use of a document authentication device in the form of a computational tag configured for short-range wireless communication only. This document authentication device can receive authentication information for a selected document from a computerized device over an established short-range wireless communication link and can use this authentication information to generate encoded data to be embedded in the selected document in order to establish the authenticity of the selected document by functioning as an imprimatur. Specifically, when embedded in the selected document, this encoded data can add a visible or non-visible feature that, upon inspection, establishes the authenticity of an electronic version of the selected document. Additionally or alternatively, the encoded data can add a printable feature, which will be readable off a surface of a printed version of the selected document to establish the authenticity of that printed version.

More particularly, disclosed herein is a document authentication system that comprises at least a document authentication device and a document authentication program (i.e., also referred to herein as a document authentication application).

The document authentication device can be a computational tag configured for short-range wireless communication only. That is, it can comprise a substrate and, on the substrate, a first transceiver that transmits and receives signals in accordance with a specific short-range wireless communication protocol and a first processor (e.g., a first microprocessor) electrically connected to the first transceiver. The document authentication program can be executable by a second processor of a computerized device. The computerized device can comprise a second transceiver that transmits and receives signals in accordance with the same specific short-range wireless communication protocol as the first transceiver of the document authentication device and that is electrically connected to the second processor.

In operation, the document authentication program can cause the computerized device to establish a short-range wireless communication link with the document authentication device when the first transceiver of the document authentication device is adjacent to (i.e., in close proximity to) the second transceiver of the computerized device. Once the short-range wireless communication link is established, the first transceiver can receive authentication information for a selected document from the second transceiver over the wireless communication link. After the authentication information is received, the first processor can generate encoded data using the authentication information. This encoded data, when embedded in the selected document (e.g., by either the first processor of the document authentication device or the second processor of the computerized device), can establish the authenticity of the selected document by functioning as an imprimatur.

Specifically, when embedded in the selected document, the encoded data can add a visible feature or non-visible feature that, upon inspection, establishes the authenticity of an electronic version of the selected document. Additionally or alternatively, the encoded data can add at least one printable feature to the selected document. In this case, the system can further comprise a printer in communication with the computerized device (e.g., over a wired network or wireless network). The printer can receive, from the computerized device after the encoded data has been embedded in the selected document, a print job that specifies the selected document. In response to receiving the print job, the printer can print a printed version of the selected document with the printable feature(s). The printable feature(s) can be readable off the printed surface of the printed version of the selected document in order to establish the authenticity of that printed version.

Also disclosed herein is a document authentication method. The document authentication method can comprise receiving, by a document authentication device from a computerized device, authentication information for a selected document. Specifically, this authentication information can be received by the document authentication device from the computerized device over a wireless communication link, which is established with the computerized device, when the document authentication device is adjacent to (i.e., in close proximity to) the computerized device.

The method can further comprise using, by the document authentication device, the authentication information to generate encoded data that, when embedded in the selected document by either the computerized device or the document authentication device, establishes the authenticity of the selected document by functioning as an imprimatur.

Specifically, when embedded in the selected document, the encoded data can add a visible or non-visible feature that, upon inspection, establishes the authenticity of an electronic version of the selected document. Additionally or alternatively, the encoded data can add at least one printable feature to the selected document. In this case, the method can further comprise receiving, by a printer from the computerized device, a print job for the selected document after the encoded data has been embedded therein. In response, a printed version of the selected document with the printable feature(s) can be printed by the printer. The printable feature(s) can be readable off the printed surface of the printed version of the selected document in order to establish the authenticity of that printed version.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

As mentioned above, historically, physical documents (i.e., non-electronic documents, including, but not limited to, hand-written, printed or copied documents) have been authenticated using imprimaturs (i.e., official marks of genuineness or validity), which are applied to the surface of a physical document using, for example, a unique stamp. These imprimaturs have many enduring conveniences, even in the digital age, because they require physical possession of the stamp itself and because they can be applied onto the surface of any type of physical document. Unfortunately, they offer only weak guarantees of genuineness or validity because the official marks can be forged and/or the stamps used to apply them may be duplicated.

Recently, techniques have been developed for embedding encoded data into a document (e.g., barcode marks, microtext marks, etc. into a printed version of a document or a digital signature into an electronic version of a document). This encoded data functions as an imprimatur in that it can subsequently be decoded and read to authenticate the printed and/or electronic versions of the document. These techniques offer greater guarantees of genuineness or validity than the imprimaturs discussed above. However, they are not foolproof because computerized devices that execute the encryption algorithms used to generate the encoded data are typically only password protected and are network accessible. Thus, they can be hacked and the encryption algorithms can be cracked.

In view of the foregoing, disclosed herein are systems and methods that provide authentication for printed and/or electronic versions of a selected document. In the systems and methods, document authentication is accomplished through the use of a document authentication device in the form of a computational tag configured for short-range wireless communication only. This document authentication device can receive authentication information for a selected document from a computerized device over an established short-range wireless communication link and can use this authentication information to generate encoded data to be embedded in the selected document in order to establish the authenticity of the selected document by functioning as an imprimatur. Specifically, when embedded in the selected document, this encoded data can add a visible or non-visible feature that, upon inspection, establishes the authenticity of an electronic version of the selected document. Additionally or alternatively, the encoded data can add a printable feature, which will be readable off a surface of a printed version of the selected document to establish the authenticity of that printed version.

Figure 1:
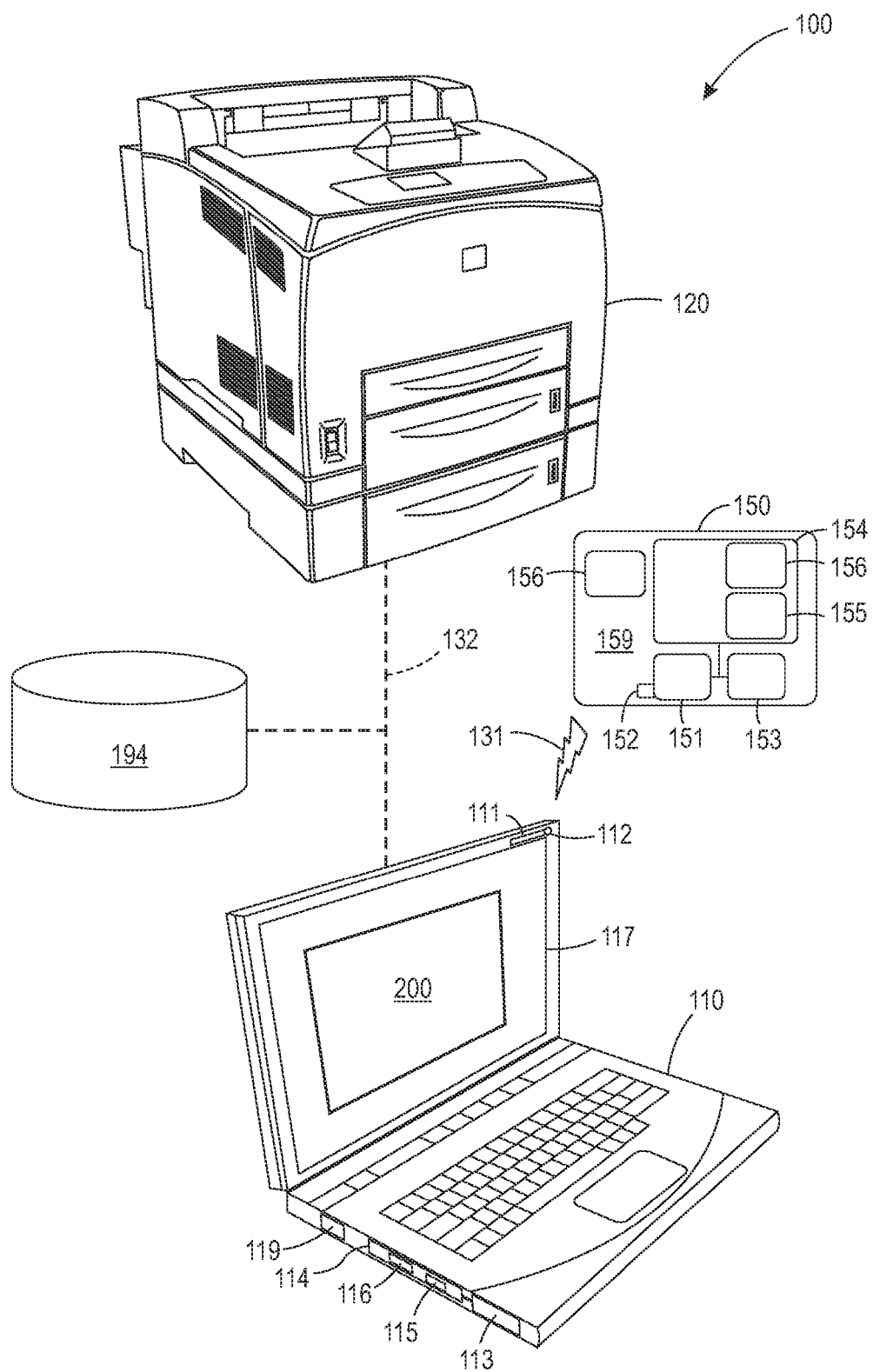
FIG. 1 is a schematic diagram illustrating a document authentication system and a document authentication device incorporated into that document authentication system.

Referring to FIG. 1 disclosed herein is a document authentication system 100 comprising a document authentication device 150, a document authentication program 116 operating on a computerized device 110 and, optionally, one or more additional system components (e.g., a printer 120, a data repository 194 or other data storage device external to and/or remote relative to the document authentication device 150 and the computerized device 110, etc.)

The document authentication device 150 can be in the form of a passive or active computational tag configured for short-range wireless communication only (e.g., radio frequency identification (RFID) communication, Bluetooth® communication or near-field communication (NFC) only). Thus, the document authentication device 150 is not otherwise accessible. That is, the document authentication device 150 is not accessible by any other electric or wireless connection.

For purposes of this disclosure, wireless communication refers to communication between devices, which are not physically connected by an electrical conductor. Short-range wireless communication refers to wireless communication in accordance with a wireless communication protocol with a relatively short communication range (i.e., with a relatively short maximum separation distance). Short-range wireless communication can include, but is not limited to, the following: radio frequency identification (RFID) communication, which use various different frequencies and, as a result, have different communication ranges; Bluetooth® communication, which use, for example, 2.4-2.5 GHz radio-frequency electromagnetic fields to transmit/receive signals and have a communication range of approximately 10 meters or less; and near-field communication (NFC), which use, for example, 13.56 MHz to transmit/receive signals and have with theoretical communication range of 20 centimeters or less and a practical communication range of approximately 4 centimeters or less. Each of the above-mentioned short-range wireless communication types uses radio-frequency electromagnetic fields to transfer signals between wireless communication-enabled devices and/or between such devices and wireless communication-enabled tags.

The complexity of wireless communication-enabled tags can vary from a simple tag to a computational tag. A simple tag is a structure comprising a substrate and, on the substrate, a memory that stores data and a transceiver. In operation, the transceiver of the simple tag receives a trigger over a wireless communication link established with a wireless communication-enabled device and, in response to the trigger, transmits data back over the link to the device. A computational tag is a structure that similarly comprises a transceiver and a memory on a substrate; however, in this case, the memory stores one or more programs of instruction and the structure also comprises a processor on the substrate. Generally, in operation, the transceiver of a computational tag receives an input over a wireless communication link with a wireless communication-enabled device, the processor executes a program using the input in order to generate an output, and the transceiver transmits the output back over the wireless communication link to the device. Wireless communication-enabled tags, including simple tags and computational tags, can be active or entirely passive. An active tag comprises an internal power source that powers its various components, whereas a passive tag has no internal power source and is instead powered through magnetic induction, when a wireless communication link is established with another device having an internal power source.

The document authentication device 150 can comprise a substrate 155 and, on the substrate 155, the components of a passive or active computational tag configured for document authentication. Specifically, the substrate 155 can comprise a card (e.g., a paper card, a cardboard card, a plastic card, etc.), a sticker (i.e., an adhesive card), a key fob or any other substrate suitable for housing the components of a computational tag. The components of the computational tag on the substrate 155 can comprise a first transceiver 151 with a first antenna 152, a first memory 154 and a first processor 153 (e.g., a microprocessor) electrically connected to the first memory 154 and the first transceiver 151.

The first transceiver 151 can transmit and receive signals (i.e., can be adapted to transmit and receive signals, can be configured to transmit and receive signals, etc.) in accordance with a specific short-range wireless communication protocol (e.g., an RFID communication protocol, a Bluetooth® communication protocol or an NFC protocol) only. For purposes of this disclosure, it should be understood that the term "transceiver" is not intended to be limiting and instead refers to either (a) a single unit, which incorporates both a transmitter that transmits signals and a receiver that receives signals (as shown) or (b) a combination of two discrete units, including a transmitter and a receiver, which each have their own corresponding antennas, and which transmit and receive signals, respectively (not shown).

The first memory 154 can store (i.e., can be adapted to store, can be configured to store, etc.) one or more programs of instructions including, but not limited to, an encryption algorithm 155. For purposes of this disclosure, the term "encryption algorithm" refers to a program of instructions that can be executed by a processor and that is used in cryptography for encoding information. Those skilled in the art will recognize that encryption algorithms typically use an encryption key to encrypt (i.e., encode) information and a corresponding decryption algorithm uses a decryption key to subsequently decrypt (i.e., decode) the encrypted information. This encryption algorithm 155 can comprise a symmetric encryption algorithm, an asymmetric encryption algorithm, or any other suitable encryption algorithm. A symmetric encryption algorithm uses the same private key to encrypt information as the corresponding symmetric decryption algorithm uses to subsequently decrypt the encrypted information. An asymmetric encryption algorithm, on the other had uses a different key to encrypt information than the corresponding asymmetric decryption algorithm uses to subsequently decrypt the encrypted information. For example, the asymmetric encryption algorithm can use a private key to encrypt information and the corresponding asymmetric decryption algorithm can use either a public key or a different private key to subsequently decrypt the encrypted information.

The computerized device 110 can comprise any wireless communication-enabled device that can (i.e., that is adapted to, that is configured to, that is programmed to, etc.) read from and write to the document authentication device 150. For example, the computerized device 110 can comprise a mobile computerize device, such as a personal computer, a laptop computer, a tablet computer, a netbook, or a personal digital assistant (PDA) (i.e., a smart phone)). Alternatively, the computerized device 110 can comprise a non-mobile computerized device, such as a desktop computer.

In any case, the computerized device 110 can comprise a second transceiver 111 with a second antenna 112. The second transceiver 111 with the second antenna 112 can transmit and receive (i.e., can be adapted to transmit and receive, can be configured to transmit and receive, etc.) signals in accordance with the same specific short-range wireless communication protocol as the first transceiver 151 of the document authentication device 150. Thus, when the second transceiver 111 with the second antenna 112 is adjacent to (i.e., is in close proximity to) the first transceiver 151 with the first antenna 152, a wireless communication link 131 (e.g., an RFID communication link, a Bluetooth® communication link or a NFC link, as appropriate) can be established between the document authentication device 150 and the computerized device 110.

It should be noted that the required proximity between the document authentication device 150 and the computerized device 110 for the establishment of the wireless communication link 131 would vary depending upon the communication protocol used. Those skilled in the art will recognize that the closer the required proximity, the more secure the document authentication system 100 will be. It should also be noted the document authentication device 150 and/or the computerized device 110 should be mobile so that one of the devices 110 and 150 can be positioned by a user adjacent to the other of the devices 110 and 150 in order to allow the wireless communication link 131 to be established. For example, the document authentication device 150 can be a mobile device (e.g., a card) physically possessed by a user and the computerized device 110 can be a non-mobile device (e.g., a desktop computer). In this case, establishment of the wireless communication link 131 would require the user to position the document authentication device 150 adjacent to the computerized device 110. The user can be responsible for securing the document authentication device 150 to prevent tampering and/or theft. Alternatively, the document authentication device 150 can be fixed to (e.g., adhered to in the case of a sticker) a given location (e.g., within a secure office building) and the computerized device 110 can be a mobile device. In this case, establishment of the wireless communication link 131 would require the user to have access to the given location in order to position the computerized device 110 adjacent to the document authentication device 150.

Additionally, the computerized device 110 can comprise a second memory 114, a display 117, and a second processor 113 electrically connected to the second memory 114, the display 117 and the second transceiver 111 (e.g., over a system bus). The second memory 114 can store the document authentication program 116 (i.e., a document authentication application or a program of instructions for document authentication). The document authentication program 116 can be executed by the second processor 113 and can comprise a graphical user interface (GUI) 200, which can be displayed on the display 117.

Figure 2A:
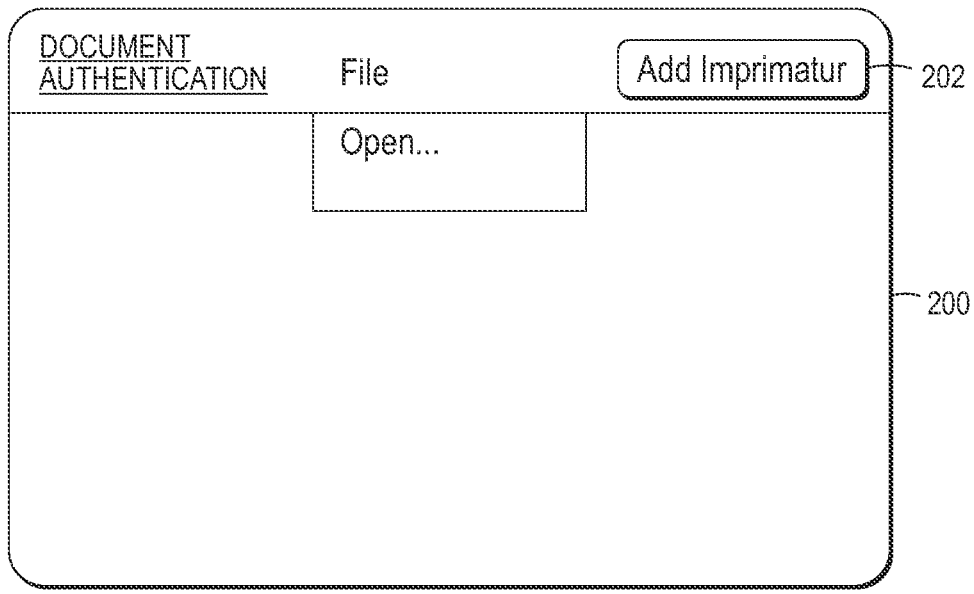
FIG. 2A is an exemplary screenshot for a document authentication graphic user interface (GUI)
Figure 2B:
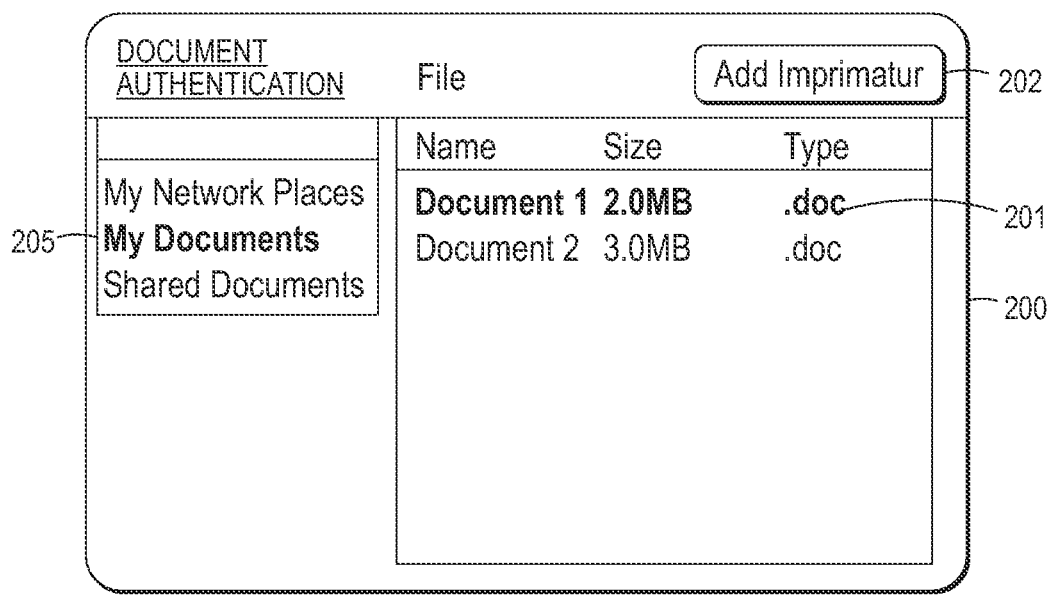
FIG. 2B is another exemplary screenshot for a document authentication graphic user interface (GUI)

FIGS. 2A-2E are exemplary screenshots for a document authentication GUI 200. FIGS. 2A-2B illustrate that, when the document authentication program 116 is opened on the computerized device 110, a user can, through the document authentication GUI 200, open a specific file 205 (e.g., My Documents, as illustrated), which is stored locally in the second memory 114 or stored remotely (e.g., on another computerized device or in an external data repository 194 connected to the computerized device 100 over a wired or wireless network 132.). The user can further select a specific document 201 (e.g., Document 1, as illustrated) from that specific file 205. Once the file is selected, the user can enter an "add imprimatur" command (e.g., by tapping on an add imprimatur icon 202).

When the "add imprimatur" command is entered and a wireless communication link 131 has been established, as discussed above, the computerized device 110 and, particularly, the second transceiver 111 with the second antenna 112 can transmit authentication information for the selected document to the document authentication device 150 over the wireless communication link 131. That is, when the "add imprimatur" command is entered, the document authentication program 116 can cause the computerized device 110 to establish the wireless communication link 131 with the document authentication device 150 and to further transmit the authentication information for the selected document to the document authentication device 150. The authentication information can be received by the document authentication device 150 and, particularly, by the first transceiver 151 with the first antenna 152.

It should be noted that the authentication information could comprise any information that could subsequently be used to authenticate the selected document. That is, the authentication information can comprise any information that could be used for the purpose of establishing the authenticity of the selected document (i.e., any information that could be used for the purpose of establishing that the selected document is genuine, any information that could be used for establishing that the selected document is what it purports to be, etc.). For example, the authentication information can comprise any of the following types of information: identification information for the author, creator or signatory of the selected document (e.g., a name, address, telephone number, identification number, electronic mail (e-mail address), and/or any other type of identification information); identification information for the association, company, group, organization, agency, etc. with which the creator, author or signatory of the selected document is associated (e.g., an official seal, a name, address, telephone number, identification number, electronic mail (e-mail address), and/or any other type of identification information); a date; a time; etc.

Figure 2C:
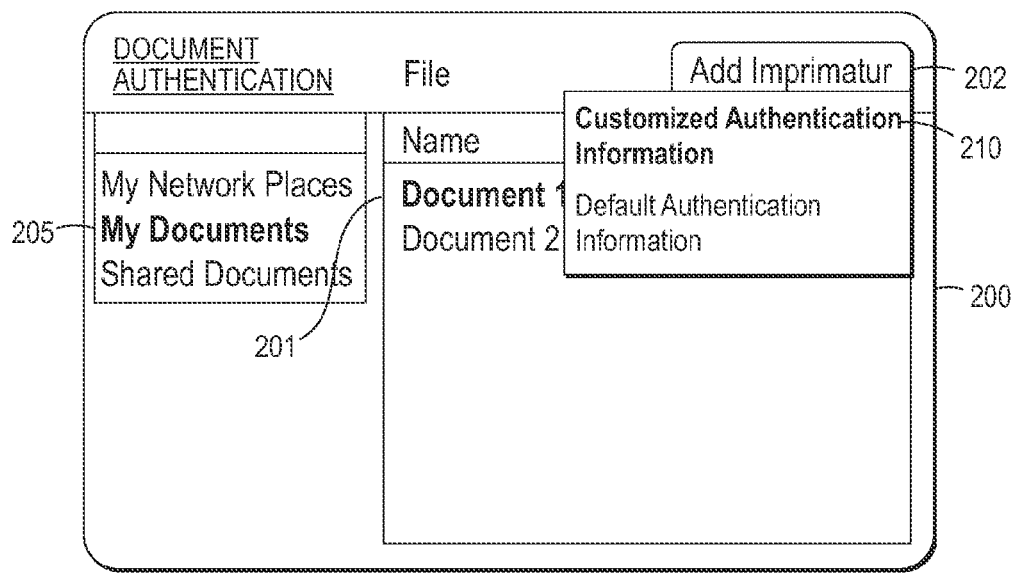
FIG. 2C is yet another exemplary screenshot for a document authentication graphic user interface (GUI)

This authentication information can comprise default information automatically associated with the selected document (e.g., creator identification information, association/company/organization/agency identification information, date, time, etc.). Alternatively, this authentication information can be customized (i.e., specifically input for the selected document by the user). For example, in response to the selection of the add imprimatur icon 202 on the document authentication GUI 200, a user could be presented with a drop down menu that allows a user to select "default authentication information" or "customized authentication information" 210, as illustrated in FIG. 2C. In response to selection of "customized authentication information", the user could be prompted to input customized authentication information.

In any case, after the authentication information is received by the document authentication device 150, the first processor 153 can access the first memory 154 and, using the authentication information, can execute the encryption algorithm 155 in order to generate encoded data that, when embedded in the selected document, can establish the authenticity of the selected document by functioning as an imprimatur. In this document authentication system 100, generation of the encoded data, which functions as an imprimatur, can be performed only by the documentation authentication device 150 and the encoded data contains evidence of this fact (e.g., through digital signing or any other scheme that provides evidence of a secret being known without revealing the secret itself (technically, a "zero knowledge proof")).

Once the encoded data is generated, the document authentication program 116 can cause the computerized device 110 and, particularly, the second processor 113 thereof to embed that encoded data in the selected document. That is, the first transceiver 151 of the document authentication device 150 can further transmit the encoded data back to the second transceiver 111 of the computerized device 110 over the wireless communication link 131. Then, the second processor 113 of the computerized device 110, executing the document authentication program 116, can embed the encoded data in the selected document.

Alternatively, the first processor 153 of the document authentication device 110 can, not only generate the encoded data, but can also embed it into the selected document. That is, the first memory 154 of the document authentication device 150 can further store a document-processing program 156. In this case, in addition to receiving the authentication information, the first transceiver 151 of the document authentication device 150 can also receive the selected document itself from the computerized device 110 over the wireless communication link 131. After the encoded data has been generated, the first processor 153 can access the first memory 154 and can execute the document-processing program 156 in order to embed the encoded data in the selected document. Once the encoded data is embedded in the selected document, the first transceiver 151 of the document authentication device 150 can transmit the selected document with the encoded data embedded therein back to the computerized device 110 over the wireless communication link 131.

In any case, when embedded in the selected document, the encoded data can add a specific visible feature (e.g., a watermark feature, a micro-text feature, a background image, a steganographic inclusion, etc.) that contains coded elements (e.g., a coded sequence of numbers or some other coded markings) or a specific non-visible feature (e.g., a digital signature contained in the meta-data of the selected document) to the selected document and this feature can function as an imprimatur, which establishes the authenticity of an electronic version (e.g., a scanned version, an emailed version, etc.) of the selected document. Specifically, upon subsequent inspection of an electronic version of the selected document, the specific visible feature(s) and/or non-visible feature(s) embedded therein can be found (e.g., by the computerized device 110 or by another computerized device) and decrypted (e.g., by the computerized device 110 or by the another computerized device, as appropriate, executing a decryption algorithm) in order to establish the authenticity of that electronic version of the selected document. Thus, the specific visible and/or non-visible feature(s) provide the electronic version of the selected document with distinguishing characteristics, from which a degree of confidence of its authenticity can be deduced.

Additionally or alternatively, the encoded data can add at least one specific printable feature to the selected document. Each specific printable feature can comprise a barcode or other feature (e.g., a watermark feature, a micro-text feature, a glossmark feature, an infrared feature, a fluorescent feature, a printable circuit feature, a background image, etc.) that contains coded elements (e.g., a coded sequence of numbers or some other coded markings). Each specific printable feature can function as an imprimatur, which establishes the authenticity of a printed version of the selected document. Specifically, as shown in FIG. 1, in this case the document authentication system 100 can further comprise a printer 120 in communication with the computerized device 110 (e.g., over a wired or wireless network 132). The printer 120 can receive a print job from the computerized device 110. This print job can specify the selected document and can be received after the encoded data has been embedded in the selected document. In response, the printer 120 can print a printed version of the selected document with the printable feature(s).

Those skilled in the art will recognize that, when the printable feature(s) require special processing, the printer 120 to which the print job is submitted must be configured to perform that special processing. For example, printable features, such as glossmarks, infrared marks, fluorescent marks and printable circuits, require specific types of inks and, thus, any printer 120 that receives such print jobs must be supplied with and able to print using the specific types of inks.

Figure 3:
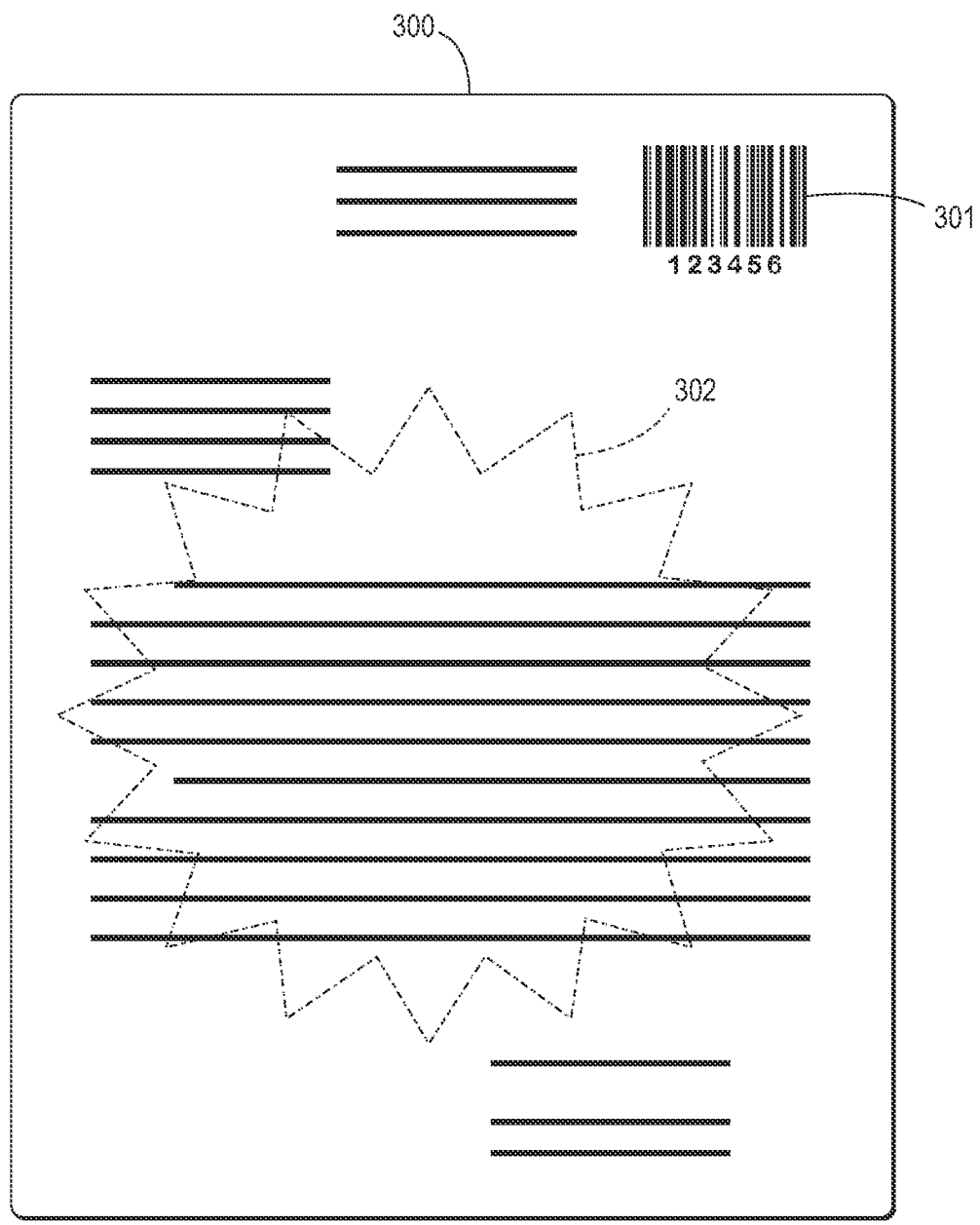
FIG. 3 illustrates an exemplary printed version a document having printable features that function as imprimaturs.

FIG. 3 illustrates an exemplary printed version 300 of a selected document with printable features comprising a barcode 301 and a background image 302 that contains a coded sequence of numbers. Upon subsequent inspection of the printed version 300 of the selected document, the specific printable feature(s) 301-302 can be found on a printed surface of the printed version, read off that printed surface (e.g., manually by a user or through an appropriate reading device, such as a code reader), and decoded (e.g., by the computerized device 110 or another computerized device executing a decryption algorithm) in order to establish the authenticity of that printed version. Thus, the specific printable feature(s) provide the printed version 300 of the selected document with distinguishing characteristics, from which a degree of confidence of its authenticity can be deduced. Code readers (i.e., scan tools, such as barcode readers, infrared readers, micro-text readers, etc.) capable of reading a printed feature off the surface of a printed document are well known in the art. Thus, the details of such code readers are omitted from this specification in order to allow the reader to focus on the salient aspects of the disclosed system.

Figure 2D:
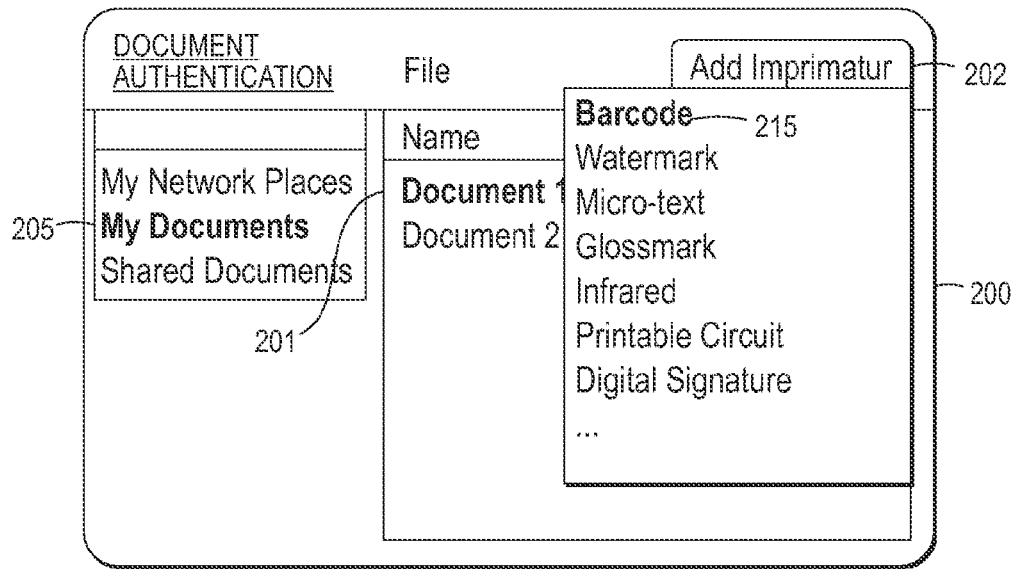
FIG. 2D is yet another exemplary screenshot for a document authentication graphic user interface (GUI)
Figure 2E:
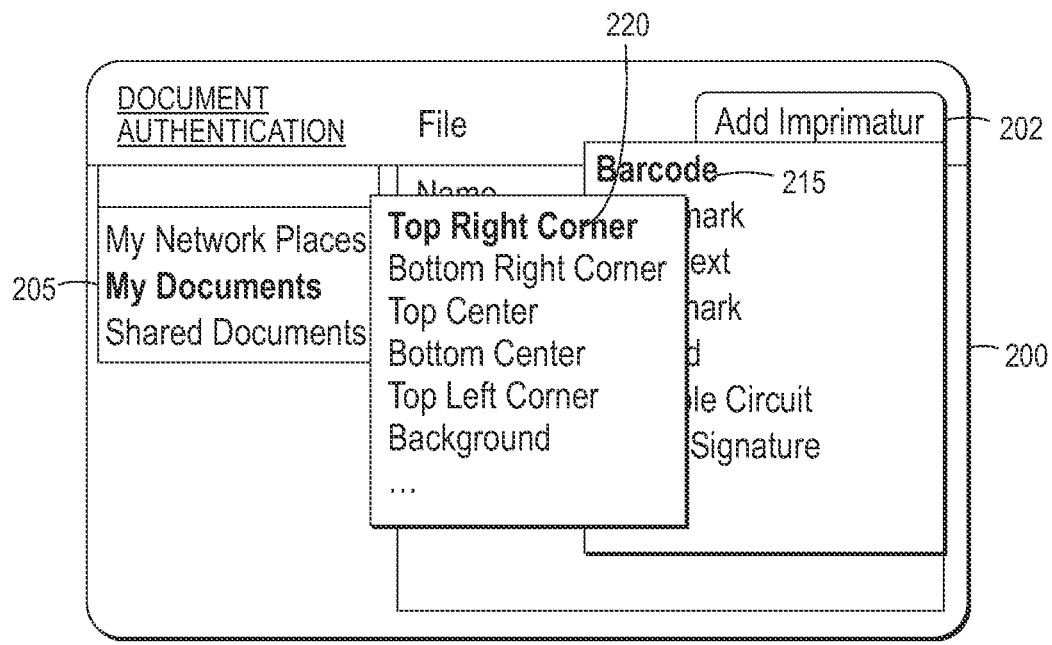
FIG. 2E is yet exemplary screenshot for a document authentication graphic user interface (GUI)

It should be noted that the specific type of feature to be added to the selected document could be set by default. Alternatively, the specific type of feature can be user-selected. For example, as illustrated in FIG. 2D, in response to the selection of the add imprimatur icon 202 on the document authentication GUI 200, a user could be presented with a drop down menu that prompts the user to select the specific type of feature 215 to be added to the selected document. Similarly, the location at which the above-described feature(s) (e.g., the visible and/or non-visible feature(s) for an electronic version of the selected document and the printable feature(s) for a printed version of the selected document) are placed within the selected document can be set by default (e.g., based on the type of feature selected or based on the type of document). Alternatively, the location can be user-selected. For example, as illustrated in FIG. 2E, in response to the selection of the specific type of feature 215 on the document authentication GUI 200, the user could be presented with another drop down menu that prompts the user to select the specific location(s) for that feature 220 within the selected document.

Figure 4:
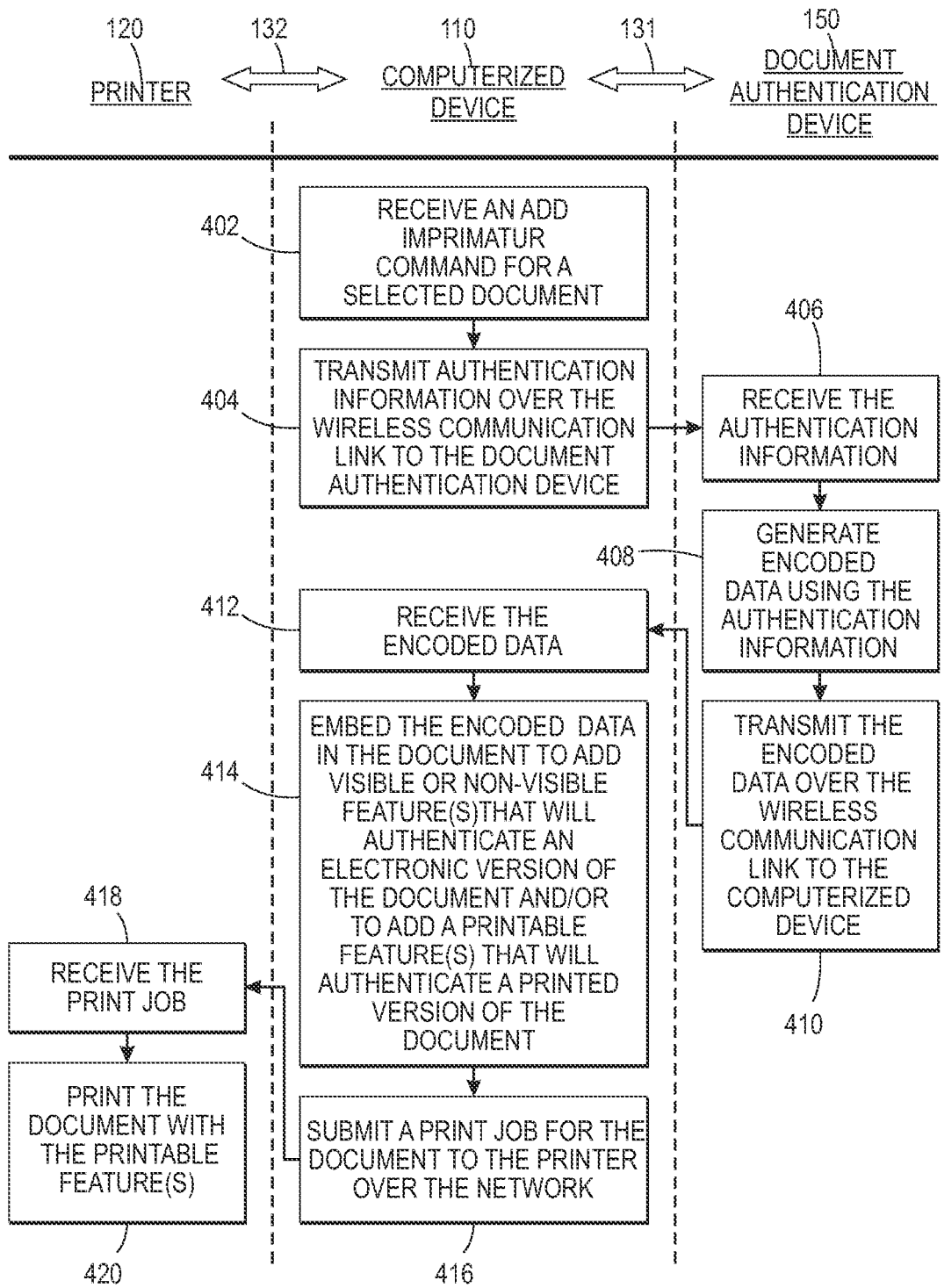
FIG. 4 is a flow diagram illustrating a document authentication method.
Figure 5:
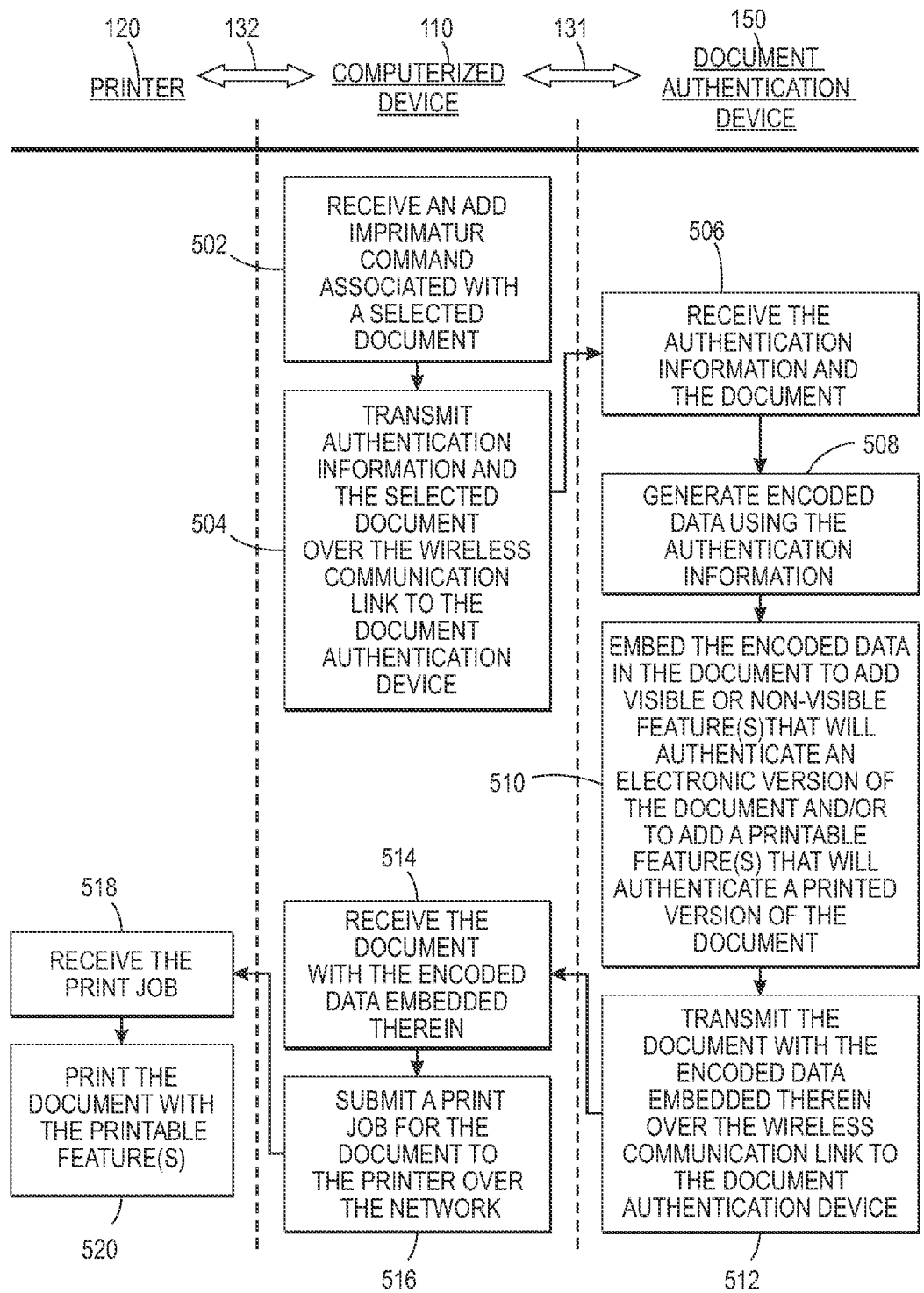
FIG. 5 is a flow diagram illustrating another document authentication method.

Referring to the flow diagrams of FIGS. 4 and 5 in combination with FIG. 1, also disclosed herein are document authentication methods. The methods can comprise providing a document authentication system 100, which, as described in detail above and illustrated in FIG. 1, comprises a document authentication device 150, a computerized device 110 and, optionally, one or more additional system components (e.g., a printer 120). For purposes of illustration, the primary components of the document authentication system 100 (i.e., the computerized device 110, the document authentication device 150 and, optionally, the printer 120 and the communication links 131 and 132 between them) are indicated at the top of the flow diagrams and the process steps performed by those components are aligned below.

As mentioned above, the document authentication device 150 can be in the form of a passive or active computational tag configured for short-range wireless communication only (e.g., radio frequency identification (RFID) communication, Bluetooth® communication or near-field communication (NFC) only). The computerized device 110 can comprise any wireless communication-enabled device that can (i.e., that is adapted to, that is configured to, that is programmed to, etc.) read from and write to the document authentication device 150. For example, the computerized device 110 can comprise a mobile computerize device, such as a personal computer, a laptop computer, a tablet computer, a netbook, or a personal digital assistant (PDA) (i.e., a smart phone)). Alternatively, the computerized device 110 can comprise a non-mobile computerized device, such as a desktop computer. In any case, the computerized device 110 can be configured for the same type of short-range wireless communication as the document authentication device such that, when the computerized device is adjacent to (i.e., is in close proximity to) the document authentication device 110, a wireless communication link 131 (e.g., an RFID communication link, a Bluetooth® communication link or a NFC link, as appropriate) can be established between the document authentication device 150 and the computerized device 110. The computerized device 110 can also be in communication with the printer 120 over a wired or wireless network 132.

In any case, the methods shown in the flow diagrams of FIGS. 4 and 5 can comprise receiving an add imprimatur command for a selected document (402 or 502). Specifically, the add imprimatur command can be received by the computerized device 110 from a user through a graphical user interface (GUI) of a document authentication program being executed on the computerized device 110. FIGS. 2A-2E are exemplary screenshots for such a document authentication GUI 200. FIGS. 2A-2B illustrate that, when the document authentication program is opened on the computerized device 110, a user can, through the document authentication GUI 200, open a specific file 205 (e.g., My Documents, as illustrated), which is stored locally or stored remotely (e.g., on another computerized device or in an external data repository connected to the computerized device over a wired or wireless network). The user can further select a specific document 201 (e.g., Document 1, as illustrated) from that specific file 205. Once the file is selected, the user can enter the "add imprimatur" command (e.g., by tapping on an add imprimatur icon 202).

Once the "add imprimatur" command is entered and a wireless communication link 131 has been established, as discussed above, the methods can comprise transmitting, by the computerized device 110, authentication information for the selected document over the wireless communication link 131 (404 or 504) and further receiving, by the document authentication device 150, that authentication information (406 or 506). As illustrated in the flow diagram of FIG. 5, in one method, the selected document can also be transmitted and received along with the authentication information (504-506).

It should be noted that the authentication information could comprise any information that could subsequently be used to authenticate the selected document. That is, the authentication information can comprise any information that could be used for the purpose of establishing the authenticity of the selected document (i.e., any information that could be used for the purpose of establishing that the selected document is genuine, any information that could be used for establishing that the selected document is what it purports to be, etc.). For example, the authentication information can comprise any of the following types of information: identification information for the author, creator or signatory of the selected document (e.g., a name, address, telephone number, identification number, electronic mail (e-mail address), and/or any other type of identification information); identification information for the association, company, group, organization, agency, etc. with which the creator, author or signatory of the selected document is associated (e.g., an official seal, a name, address, telephone number, identification number, electronic mail (e-mail address), and/or any other type of identification information); a date; a time; etc.

This authentication information can comprise default information automatically associated with the selected document (e.g., creator identification information, association/company/organization/agency identification information, date, time, etc.). Alternatively, this authentication information can be customized (i.e., specifically input for the selected document by the user). For example, in response to the selection of the add imprimatur icon 202 on the document authentication GUI 200, a user could be presented with a drop down menu that allows a user to select "default authentication information" or "customized authentication information" 210, as illustrated in FIG. 2C. In response to selection of "customized authentication information", the user could be prompted to input customized authentication information.

Once the authentication information is received by the document authentication device 150, it can be used to generate encoded data that, when embedded in the selected document, can establish the authenticity of the selected document by functioning as an imprimatur (408 or 508). Specifically, the document authentication device 110 can comprise a memory that stores an encryption algorithm (e.g., an asymmetric encryption algorithm or a symmetric encryption algorithm) and a processor (e.g., a microprocessor) that accesses and executes that encryption algorithm using the authentication information to generate the encoded data. In these document authentication methods, generation of the encoded data, which functions as an imprimatur, can be performed only by the documentation authentication device 150 and the encoded data contains evidence of this fact (e.g., through digital signing or any other scheme that provides evidence of a secret being known without revealing the secret itself (technically, a "zero knowledge proof")).

Once the encoded data is generated, it can be embedded in the selected document.

For example, referring specifically to the method shown in the flow diagram of FIG. 4, the encoded data can be transmitted by the document authentication device 150 over the wireless communication link 131 and received by the computerized device 110 (410)-(412). Then, the computerized device 110 can embed the encoded data in the selected document (414).

Alternatively, referring specifically to the method shown in the flow diagram of FIG. 5, when the selected document also received by the document authentication device 110 at process 506, the document authentication device 150 can embed the encoded data in the selected document (510). Once the encoded data is embedded in the selected document, the selected document with the encoded data embedded therein can be transmitted by the document authentication device 150 over the wireless communication link 131 and received by the computerized device 110 (512)-(514).

In any case, when embedded in the selected document, the encoded data can add a specific visible feature (e.g., a watermark feature, a micro-text feature, a background image, a steganographic inclusion, etc.) that contains coded elements (e.g., a coded sequence of numbers or some other coded markings) or a specific non-visible feature (e.g., a digital signature contained in the meta-data of the selected document) to the selected document and this feature can function as an imprimatur, which establishes the authenticity of an electronic version (e.g., a scanned version, an emailed version, etc.) of the selected document. Specifically, upon subsequent inspection of the selected document, the specific visible feature(s) and/or non-visible feature(s) embedded in the electronic document of the selected document can be found (e.g., by the computerized device 110 or by another computerized device) and decrypted (e.g., by the computerized device 110 or by the another computerized device, as appropriate, executing a decryption algorithm) in order to establish the authenticity of the electronic document. Thus, the specific visible and/or non-visible feature(s) provide the electronic version of the document with distinguishing characteristics, from which a degree of confidence of its authenticity can be deduced.

Additionally or alternatively, the encoded data can add at least one specific printable feature to the document. Each specific printable feature can comprise a barcode or other feature (e.g., a watermark feature, a micro-text feature, a glossmark feature, an infrared feature, a fluorescent feature, a printable circuit feature, a background image, etc.) that contains coded elements (e.g., a coded sequence of numbers or some other coded markings). Each specific printable feature can function as an imprimatur, which establishes the authenticity of a printed version of the document. Specifically, in this case the document authentication methods shown in FIGS. 4 and 5 can further comprise submitting a print job for the selected document after the encoded data has been embedded therein. The print job can be submitted by the computerized device 110 (e.g., over the wired or wireless network 132) and can be received by the printer 120 (416-418 or 516-518). In response, a printed version of the selected document with the printable feature(s) can be printed by the printer 120 (420 or 520).

Those skilled in the art will recognize that, when the printable feature(s) require special processing, the printer 120 to which the print job is submitted must be configured to perform that special processing. For example, printable features, such as glossmarks, infrared marks, fluorescent marks and printable circuits, require specific types of inks and, thus, any printer 120 that receives such print jobs must be supplied with and able to print using the specific types of inks.

As mentioned above, FIG. 3 illustrates an exemplary printed version 300 of a selected document with printable features comprising a barcode 301 and a background image 302 that contains a coded sequence of numbers. Upon subsequent inspection of the printed version 300 of the document, the specific printable feature(s) 301-302 can be found on a printed surface of the printed version, read off that printed surface (e.g., manually by a user or through an appropriate reading device, such as a code reader), and decoded (e.g., by the computerized device 110 or another computerized device executing a decryption algorithm) in order to establish the authenticity of that printed version. Thus, the specific printable feature(s) provide the printed version 300 of the document with distinguishing characteristics, from which a degree of confidence of its authenticity can be deduced. Code readers (i.e., scan tools, such as barcode readers, infrared readers, micro-text readers, etc.) capable of reading a printed feature off the surface of a printed document are well known in the art. Thus, the details of such code readers are omitted from this specification in order to allow the reader to focus on the salient aspects of the disclosed system.

It should be noted that in the methods described above the specific type of feature to be added to the document can be set by default or user-selected. Additionally, the location at which the above-described feature(s) (e.g., the visible and/or non-visible feature(s) for an electronic version of the document and the printable feature(s) for a printed version of the document) are placed within the document can be set by default (e.g., based on the type of feature selected or based on the type of document) or user-selected.

Figure 6:
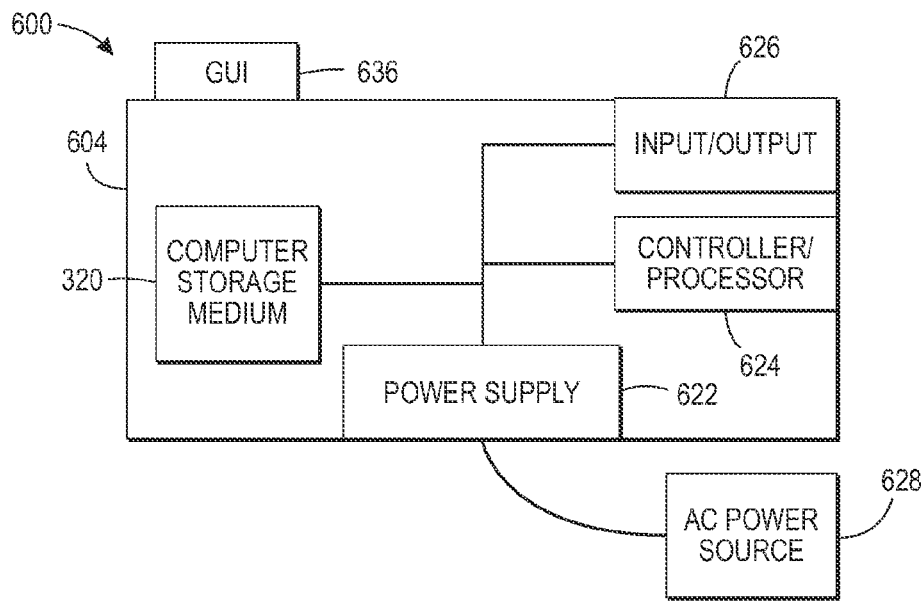
FIG. 6 is a schematic diagram illustrating an exemplary computer system that can be incorporated into the document authentication systems and methods disclosed herein; and, FIG. 7 is a schematic diagram illustrating an exemplary printing device that can be incorporated into the document authentication systems and methods disclosed herein.

FIG. 6 illustrates an exemplary computer system 600, which can be incorporated into the document authentication system 100 of FIG. 1 as the computerized device 110 and which can similarly be incorporated into the methods of FIGS. 4 and 5. This computer system 600 can comprise at least a housing 604 and, contained within the housing 604, multiple functional components including, but not limited to, a controller/processor 624, a communications port (i.e., an input/output device) 626, and a memory (e.g., including, but not limited to, a non-transitory computer readable storage medium 620) operatively connected (e.g., over a system bus). The computer system 600 can further comprise at least one accessory functional component, such as a graphic user interface assembly 636, in communication with the processor 624 (e.g., over the system bus). The multiple functional components, including any accessory functional components, can operate on power supplied from an alternating current (AC) source 628 via an internal power supply 622. This internal power supply 622 can comprise a power storage element (e.g., a battery, etc.).

The communications port (i.e., the input/output device) 626 can be used for communications between the computer system 600 and other computerized devices and/or printing devices on a network. The controller/processor 624 can control the various actions of the computer system 600. The non-transitory computer-readable storage medium 620 can comprise, for example, an optical storage device, a magnetic storage device, a capacitor-based storage device or any other suitable computer-readable storage device. This computer-readable storage device can be readable by the controller/processor 624 and can store instructions that the controller/processor 624 can execute to allow the computer system 600 to perform its various functions and, particularly, the document authentication processes discussed in detail above.

Figure 7:
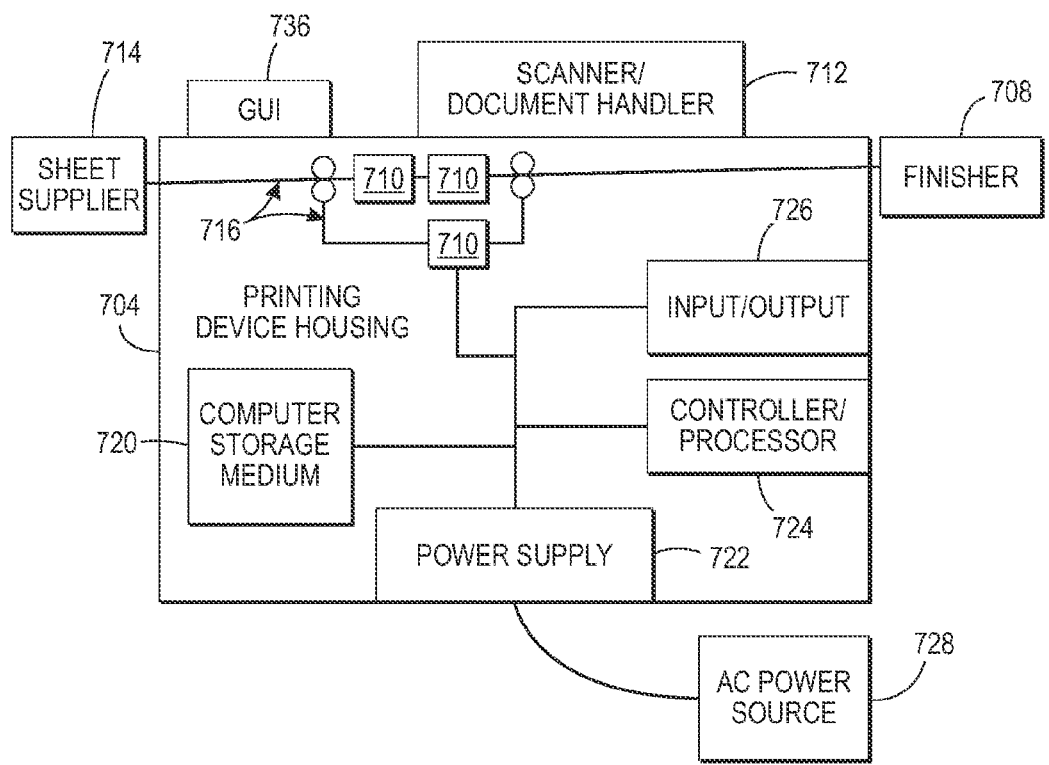

FIG. 7 illustrates an exemplary printing device 700, which can be incorporated into the document authentication system 100 of FIG. 1 as the printer 120 and which can similarly be incorporated into the methods of FIGS. 4 and 5. The printing device 700 can comprise, for example, a printer, a copier, a multi-function device, etc. Specifically, the printing device 700 can comprise a housing 704 and, contained within the housing 704, multiple functional components including, but not limited to, a controller/processor 724, a communications port (i.e., an input/output device) 726, a memory (including, but not limited to, a non-transitory computer readable storage medium 720), at least one print media path 716, and at least one print engine 710 (i.e., at least one marking device) operatively connected (e.g., over a system bus). The printing device 700 can further comprise multiple accessory functional components, such as a graphic user interface assembly 736, a sheet suppler 714, a document finisher 708 and a document handler 712, in communication with the controller/processor 724 (e.g., over the system bus). The multiple functional components, including any accessory functional components, can operate on power supplied from an alternating current (AC) source 728 via an internal power supply 722. This internal power supply 722 can comprise a power storage element (e.g., a battery, etc.).

The communications port (i.e., the input/output device) 726 can be used for communications between the printing device 700 and other computerized devices and/or printing devices on a network. The controller/processor 724 can control the various actions of the printing device 700. The non-transitory computer-readable storage medium 720 can comprise, for example, an optical storage device, a magnetic storage device, a capacitor-based storage device or any other suitable computer-readable storage device. This computer-readable storage device can be readable by the controller/processor 724 and can store instructions that the controller/processor 724 can execute to allow the printing device 700 to perform its various functions. The media path(s) 716 can be positioned to transport sheets of media from the sheet supplier 714 through the print engine(s) 710, as controlled by the controller/processor 724. After receiving various markings from the printing engine(s) 710, the sheets of media can be transmitted to an output tray (not shown) or, optionally, to the finisher 708, which can fold, staple, sort, etc., the various printed sheets.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the systems and methods described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes. Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

Disclosed above are systems and methods that provide authentication for printed and/or electronic versions of a document. In the systems and methods, document authentication is accomplished through the use of a document authentication device in the form of a computational tag configured for short-range wireless communication only. This document authentication device can receive authentication information for a document from a computerized device over an established short-range wireless communication link and can use this authentication information to generate encoded data to be embedded in the document in order to establish the authenticity of the document by functioning as an imprimatur. Specifically, when embedded in the document, this encoded data can add a visible or non-visible feature that, upon inspection, establishes the authenticity of an electronic version of the document. Additionally or alternatively, the encoded data can add a printable feature, which will be readable off a surface of a printed version of the document to establish the authenticity of that printed version. The disclosed systems and methods have the added benefit of operating in a more secure environment as compared to other document authentication systems and methods. This is because the document authentication device, in the form of a computational tag, provides an extra guarantor of security, which is analogous to "two factor" authentication. Firstly, the user has to have physical access to the document authentication device in order to use it. Secondly, the document authentication device is only enabled to communicate with other devices via a short-range wireless communication link and is, thus, not network connected and not readily susceptible to attack by a malicious program or hacker.

What is claimed is:

1. A document authentication system comprising:
   a document authentication device comprising a substrate and, on said substrate, a first transceiver, a first memory and a first processor electrically connected to said first transceiver and said first memory, said first transceiver operating in accordance with a specific short-range wireless communication protocol; and
   a document authentication program executable by a second processor of a computerized device, said computerized device comprising a second transceiver and a second memory electrically connected to said second processor, said second transceiver operating in accordance with said specific short-range wireless communication protocol,
   said document authentication program allowing a user to select a selected electronic document from a file stored in said second memory and to enter an add imprimatur command for said selected electronic document and, in response to said add imprimatur command, causing said computerized device to establish a wireless communication link with said document authentication device when said first transceiver is within a predetermined proximity of said second transceiver,
   said predetermined proximity being equal to a maximum separation distance associated with said specific short-range wireless communication protocol,
   said first transceiver receiving, from said second transceiver over said wireless communication link, authentication information for said selected electronic document,
   wherein, before said first transceiver receives said authentication information from said second transceiver, said user is presented with selectable options to define said authentication information for said selected electronic document, said selectable options comprising default authentication information and user-customized authentication information, and,
   said first processor using said authentication information to generate encoded data to be embedded in said selected electronic document, said encoded data adding at least one of the following to said selected electronic document:
   a printable feature to establish authenticity of a printed version of said selected electronic document;
   a visible feature to establish authenticity of said selected electronic document; and
   a non-visible feature to establish authenticity of said selected electronic document.

2. The document authentication system of claim 1, said first transceiver transmitting said encoded data to said second transceiver over said wireless communication link, and
said document authentication program further causing said computerized device to embed said encoded data in said selected electronic document.

3. The document authentication system of claim 1, said first transceiver receiving said selected electronic document from said second transceiver over said wireless communication link,
said first processor embedding said encoded data in said selected electronic document, and
after said embedding, said first transceiver transmitting said selected electronic document back to said second transceiver over said wireless communication link.

4. The document authentication system of claim 1, said specific short-range wireless communication protocol comprising any one of a radio frequency identification (RFID) communication protocol with a frequency dependent maximum separation distance, a Bluetooth® communication protocol with a 10 meter maximum separation distance, and a near-field communication (NFC) protocol with a 20 centimeter maximum separation distance.

5. The document authentication system of claim 1, said first memory storing an encryption algorithm and said first processor further accessing said first memory and executing said encryption algorithm to generate said encoded data, said encryption algorithm comprising any one of an asymmetric encryption algorithm and a symmetric encryption algorithm.

6. The document authentication system of claim 1, said printable feature comprising at least one of a barcode feature, a watermark feature, a micro-text feature, a glossmark feature, a fluorescent feature, an infrared feature, and a printable circuit feature.

7. A document authentication system comprising:
  a document authentication device comprising a substrate and, on said substrate, a first transceiver, a first memory and a first processor electrically connected to said first transceiver and said first memory, said first transceiver operating in accordance with a specific short-range wireless communication protocol;
  a document authentication program executable by a second processor of a computerized device, said computerized device comprising a second transceiver and a second memory electrically connected to said second processor, said second transceiver operating in accordance with said specific short-range wireless communication protocol; and,
  a printer in communication with said computerized device,
  said document authentication program allowing a user to select a selected electronic document from a file stored in said second memory and to enter an add imprimatur command for said selected electronic document and, in response to said add imprimatur command, causing said computerized device to establish a wireless communication link with said document authentication device when said first transceiver is within a predetermined proximity of said second transceiver,
  said predetermined proximity being equal to a maximum separation distance associated with said specific short-range wireless communication protocol,
  said first transceiver receiving, from said second transceiver over said wireless communication link, authentication information for said selected electronic document,
  wherein, before said first transceiver receives said authentication information from said second transceiver, said user is presented with selectable options to define said authentication information for said selected electronic document, said selectable options comprising default authentication information and user-customized authentication information, and said default authentication information comprising at least identification information for an author, creator or signatory of said selected electronic document,
  said first processor using said authentication information to generate encoded data,
  said first transceiver transmitting said encoded data to said second transceiver over said wireless communication link,
  said document authentication program further causing said computerized device to embed said encoded data in said selected electronic document so as to add at least one printable feature to said selected electronic document,
  said printer receiving, from said computerized device after said encoded data has been embedded in said selected electronic document, a print job that specifies said selected electronic document, and
  said printer, in response to said receiving of said print job, printing a printed version of said selected electronic document with said at least one printable feature, said at least one printable feature comprising coded elements and being readable off a surface of said printed version to indicate that said printed version of said selected electronic document is genuine and, thereby authenticate said printed version of said selected electronic document.

8. The document authentication system of claim 7, said print job being submitted to said printer from said computerized device over any one of a wired network and a wireless network.

9. The document authentication system of claim 7, said specific short-range wireless communication protocol comprising any one of a radio frequency identification (RFID) communication protocol with a frequency dependent maximum separation distance, a Bluetooth® communication protocol with a 10 meter maximum separation distance, and a near-field communication (NFC) protocol with a 20 centimeter maximum separation distance.

10. The document authentication system of claim 7, said first memory storing an encryption algorithm and said first processor accessing said first memory and executing said encryption algorithm to generate said encoded data, said encryption algorithm comprising any one of an asymmetric encryption algorithm and a symmetric encryption algorithm.

11. The document authentication system of claim 7, said at least one printable feature comprising at least one of a barcode feature, a watermark feature, a micro-text feature, a glossmark feature, a fluorescent feature, an infrared feature, and a printable circuit feature.

12. The document authentication system of claim 7, said encoded data further adding at least one of a visible feature and a non-visible feature to said selected electronic document to establish authenticity of said selected electronic document.

13. A document authentication method comprising:
  receiving, by a document authentication device, authentication information for a selected electronic document, said authentication information being received by said document authentication device from a computerized device over a wireless communication link established when a user has, through said computerized device, selected said selected electronic document and entered an add imprimatur command for said selected electronic document and when said document authentication device is within a predetermined proximity of said computerized device, said predetermined proximity being equal to a maximum separation distance associated with a specific short-range wireless communication protocol employed by both a first transceiver of said document authentication device and a second transceiver of said computerized device, wherein, before said receiving, said user is presented with selectable options to define said authentication information for said selected electronic document, said selectable options comprising default authentication information and user-customized authentication information; and,
  using, by said document authentication device, said authentication information to generate encoded data that, when embedded in said selected electronic document, authenticates said selected electronic document by adding at least one of the following to said selected electronic document:
a printable feature to establish authenticity of a printed version of said selected electronic document;
a visible feature to establish authenticity of said selected electronic document; and
a non-visible feature to establish authenticity of said selected electronic document.

14. The document authentication method of claim 13, further comprising transmitting, by said document authentication device, said encoded data to said computerized device over said wireless communication link so as to allow said computerized device to embed said encoded data in said selected electronic document.

15. The document authentication method of claim 13, further comprising:
receiving, by said document authentication device, said selected electronic document from said computerized device over said wireless communication link;
embedding, by said document authentication device, said encoded data in said selected electronic document; and,
after said embedding, transmitting, by said document authentication device, said selected electronic document back to said computerized device over said wireless communication link.

16. The document authentication method of claim 13, said specific short-range wireless communication protocol comprising any one of a radio frequency identification (RFID) communication protocol with a frequency dependent maximum separation distance, a Bluetooth® communication protocol with a 10 meter maximum separation distance, and a near-field communication (NFC) protocol with a 20 centimeter maximum separation distance.

17. The document authentication method of claim 13, said using of said authentication information to generate said encoded data comprising: accessing an encryption algorithm stored in a memory of said document authentication device; and executing said encryption algorithm using said authentication information to generate said encoded data, said encryption algorithm comprising any one of an asymmetric encryption algorithm and a symmetric encryption algorithm.

18. The document authentication method of claim 13, said printable feature comprising at least one of a barcode feature, a watermark feature, a micro-text feature, a glossmark feature, a fluorescent feature, an infrared feature, and a printable circuit feature.

19. A document authentication method comprising:
receiving, by a document authentication device, authentication information for a selected electronic document, said authentication information being received by said document authentication device from a computerized device over a wireless communication link established when a user has, through said computerized device, selected said selected electronic document and entered an add imprimatur command for said selected electronic document and when said document authentication device is within a predetermined proximity of said computerized device, wherein, before said receiving, said user is presented with selectable options to define said authentication information for said selected electronic document, said selectable options comprising default authentication information and user-customized authentication information, said default authentication information comprising at least identification information for an author, creator or signatory of said selected electronic document and said predetermined proximity being equal to a maximum separation distance associated with a specific short-range wireless communication protocol employed by a first transceiver of said document authentication device and a second transceiver of said computerized device;
using, by said document authentication device, said authentication information to generate encoded data;
transmitting, by said document authentication device, said encoded data to said computerized device over said wireless communication link;
embedding, by said computerized device, said encoded data in said selected electronic document;
receiving, by a printer from said computerized device after said encoded data has been embedded in said selected electronic document, a print job that specifies said selected electronic document; and,
printing, by said printer in response to said receiving of said print job, a printed version of said selected electronic document with at least one printable feature, said at least one printable feature being readable off a surface of said printed version to indicate that said printed version of said selected electronic document is genuine and, thereby authenticate said printed version of said selected electronic document.

20. The document authentication method of claim 19,
said specific short-range wireless communication protocol comprising any one of a radio frequency identification (RFID) communication protocol with a frequency dependent maximum separation distance, a Bluetooth® communication protocol with a 10 meter maximum separation distance, and a near-field communication (NFC) protocol with a 20 centimeter maximum separation distance, and
said print job being received by said printer from said computerized device over any one of a wire network and a wireless network.

21. The document authentication method of claim 19, said at least one printable feature comprising at least one of a barcode feature, a watermark feature, a micro-text feature, a glossmark feature, a fluorescent feature, an infrared feature, and a printable circuit feature.

* * * * *